Nov. 6, 1928.
R. H. MATTHIESSEN ET AL
1,690,827
DEVICE FOR CHECKING THE OPERATION OF VEHICLES
Filed Dec. 11, 1922
9 Sheets-Sheet 1
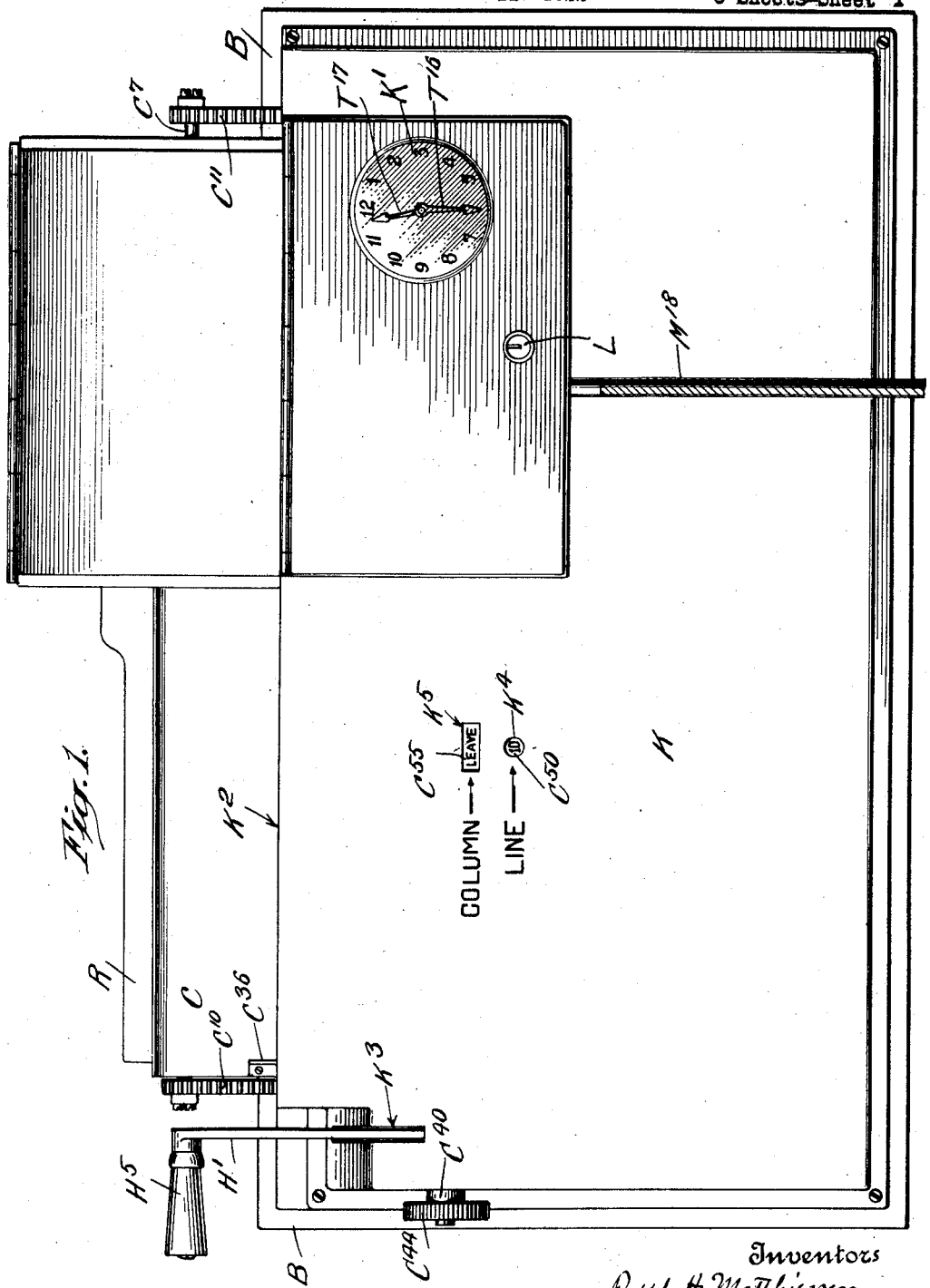

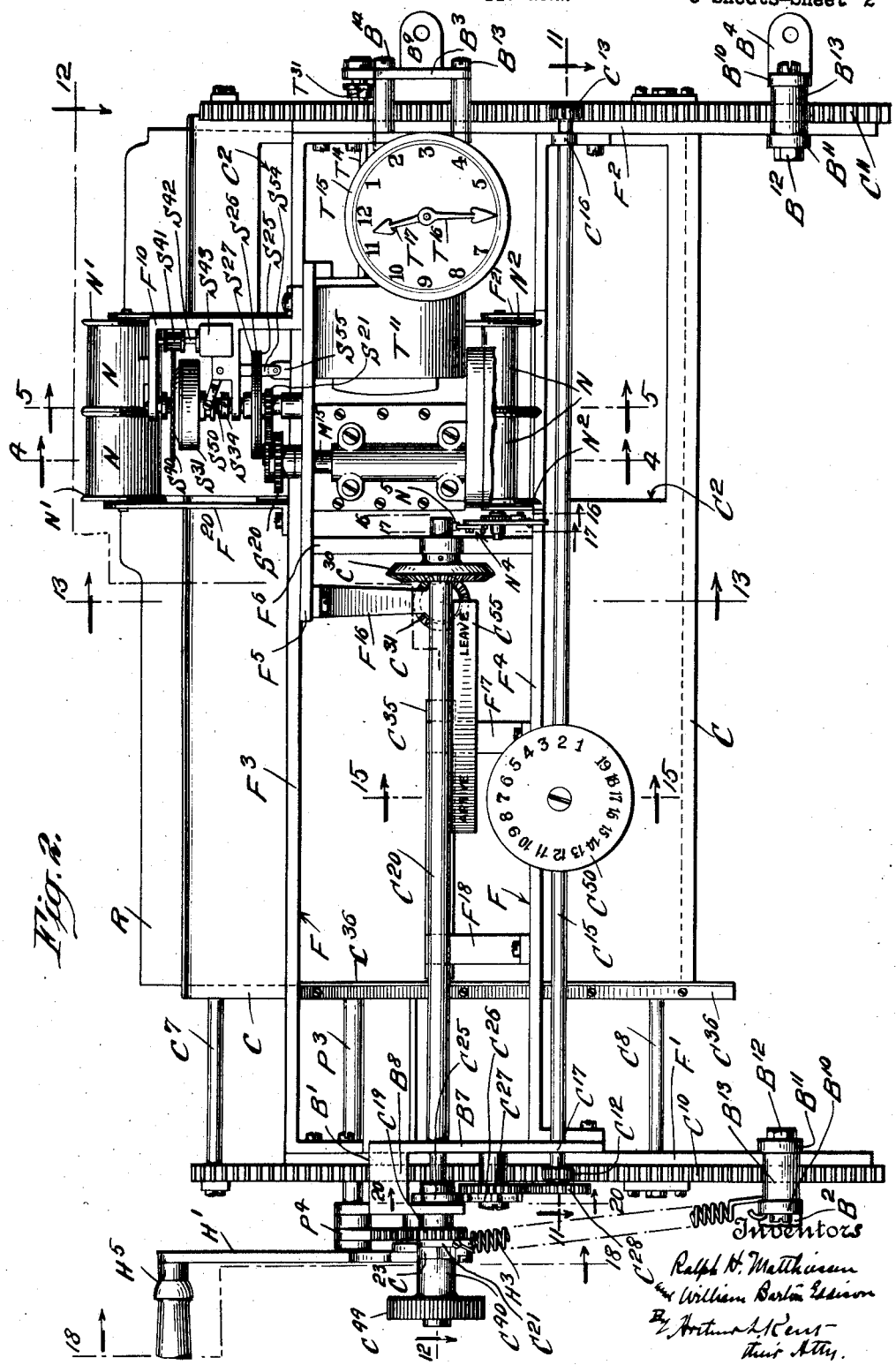

Nov. 6, 1928.
1,690,827
R. H. MATTHIESSEN ET AL
DEVICE FOR CHECKING THE OPERATION OF VEHICLES
Filed Dec. 11, 1922
9 Sheets-Sheet 3

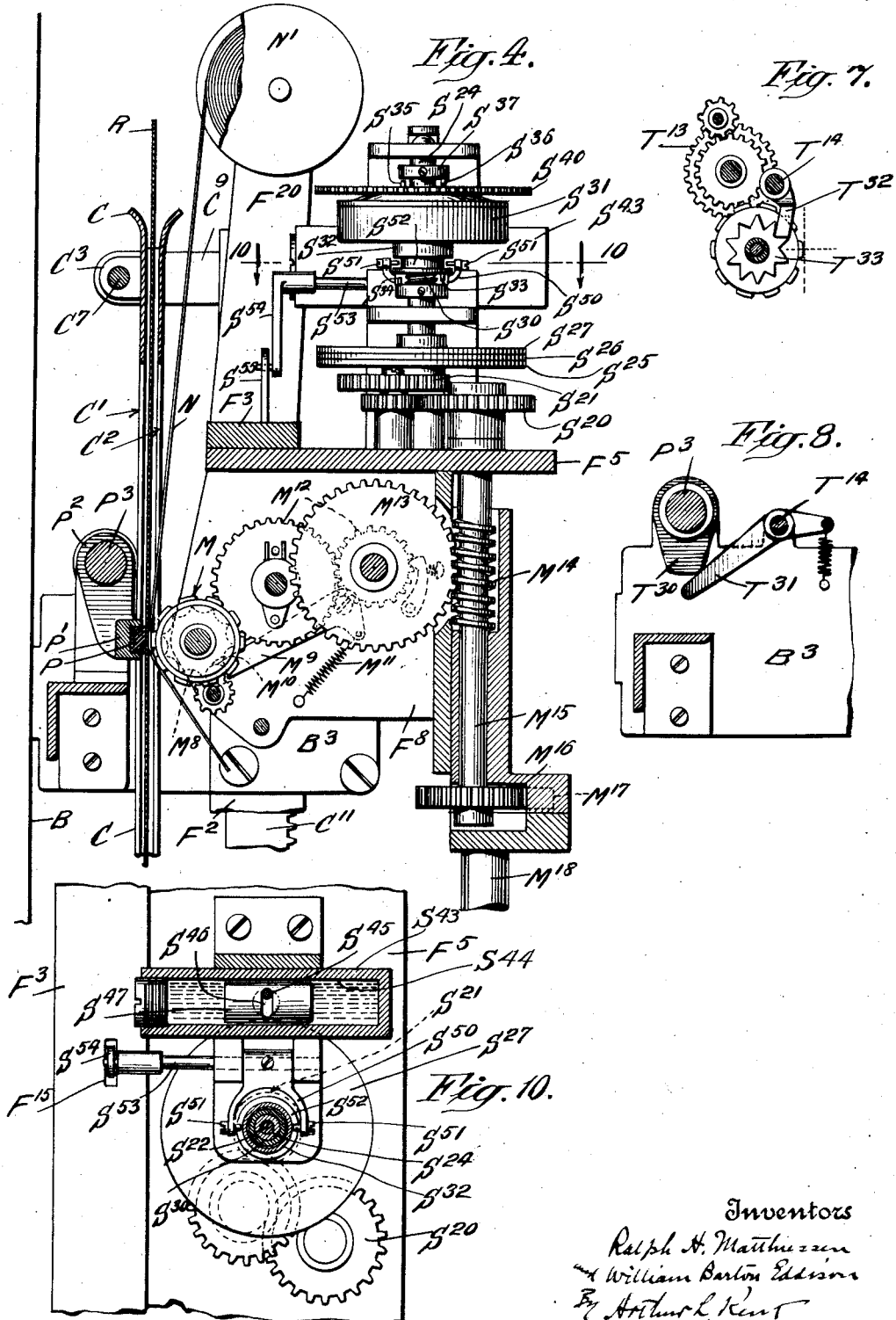

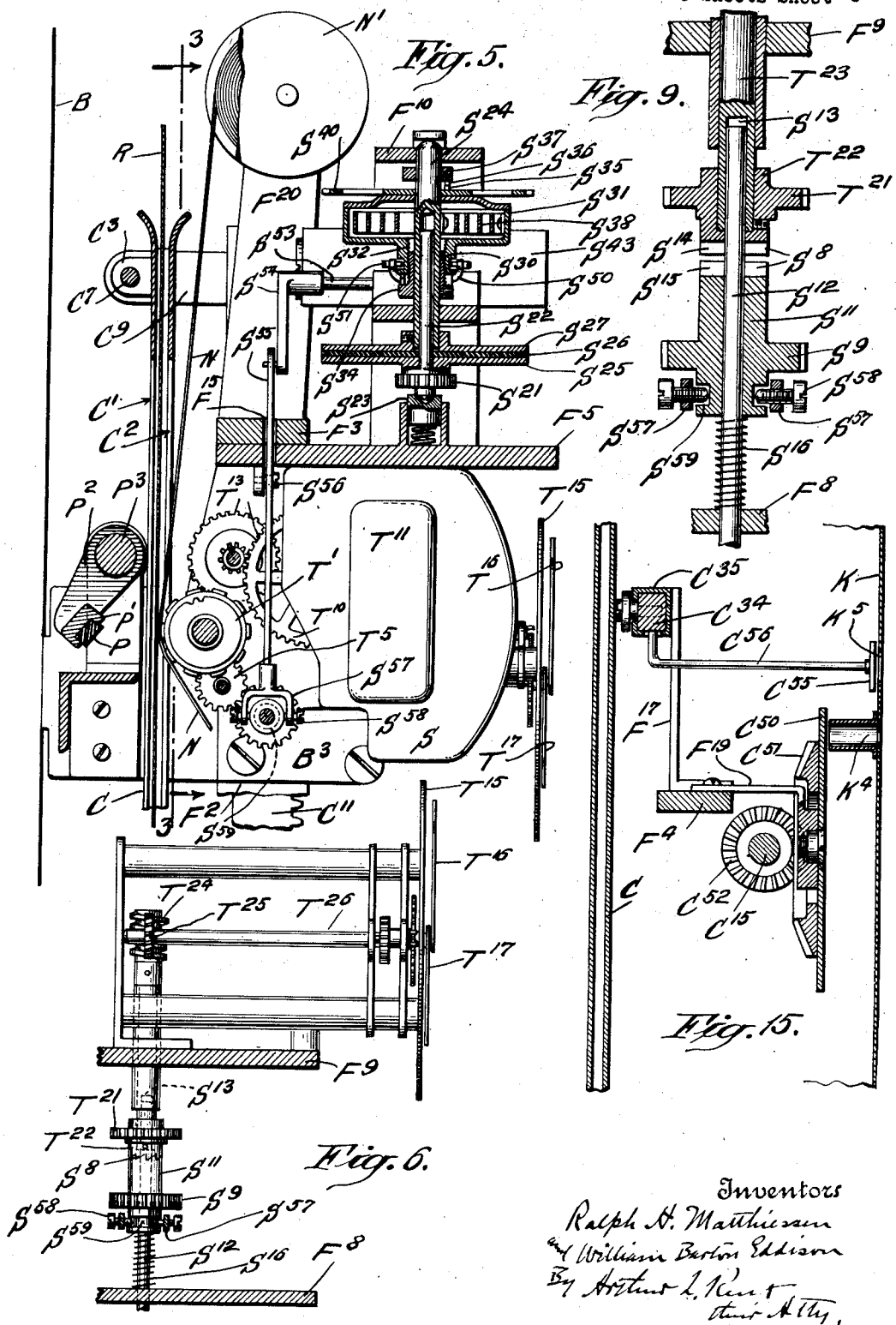

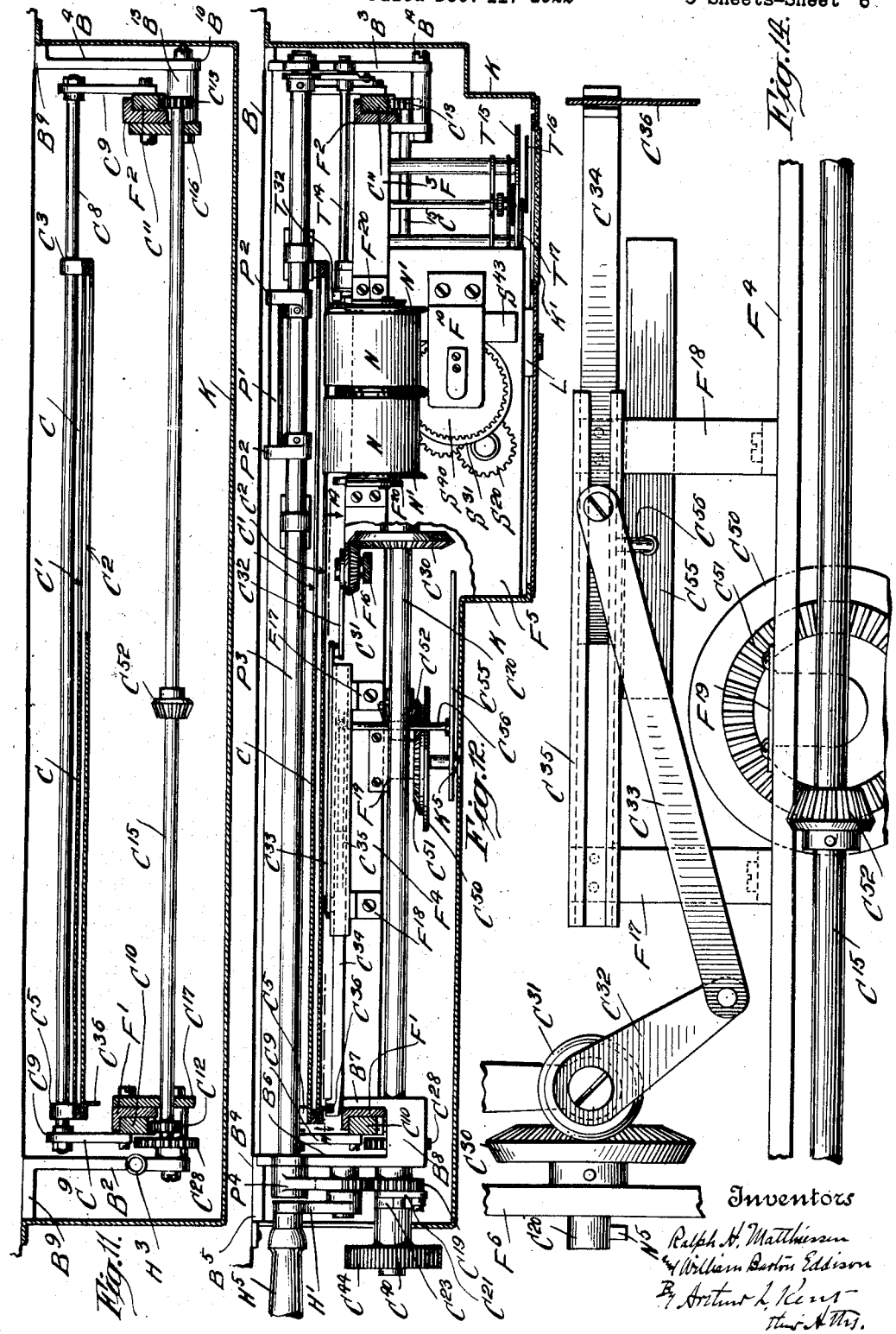

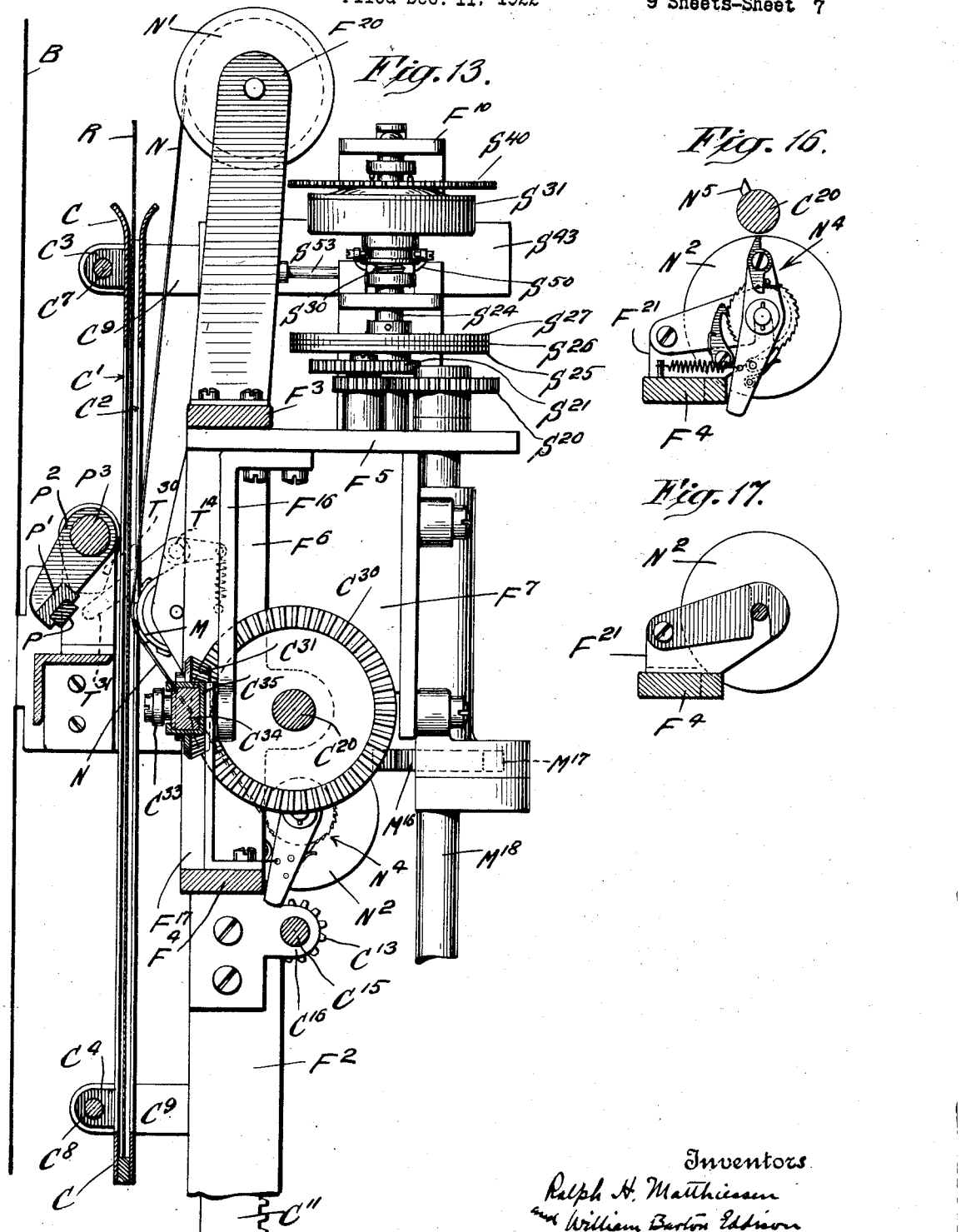

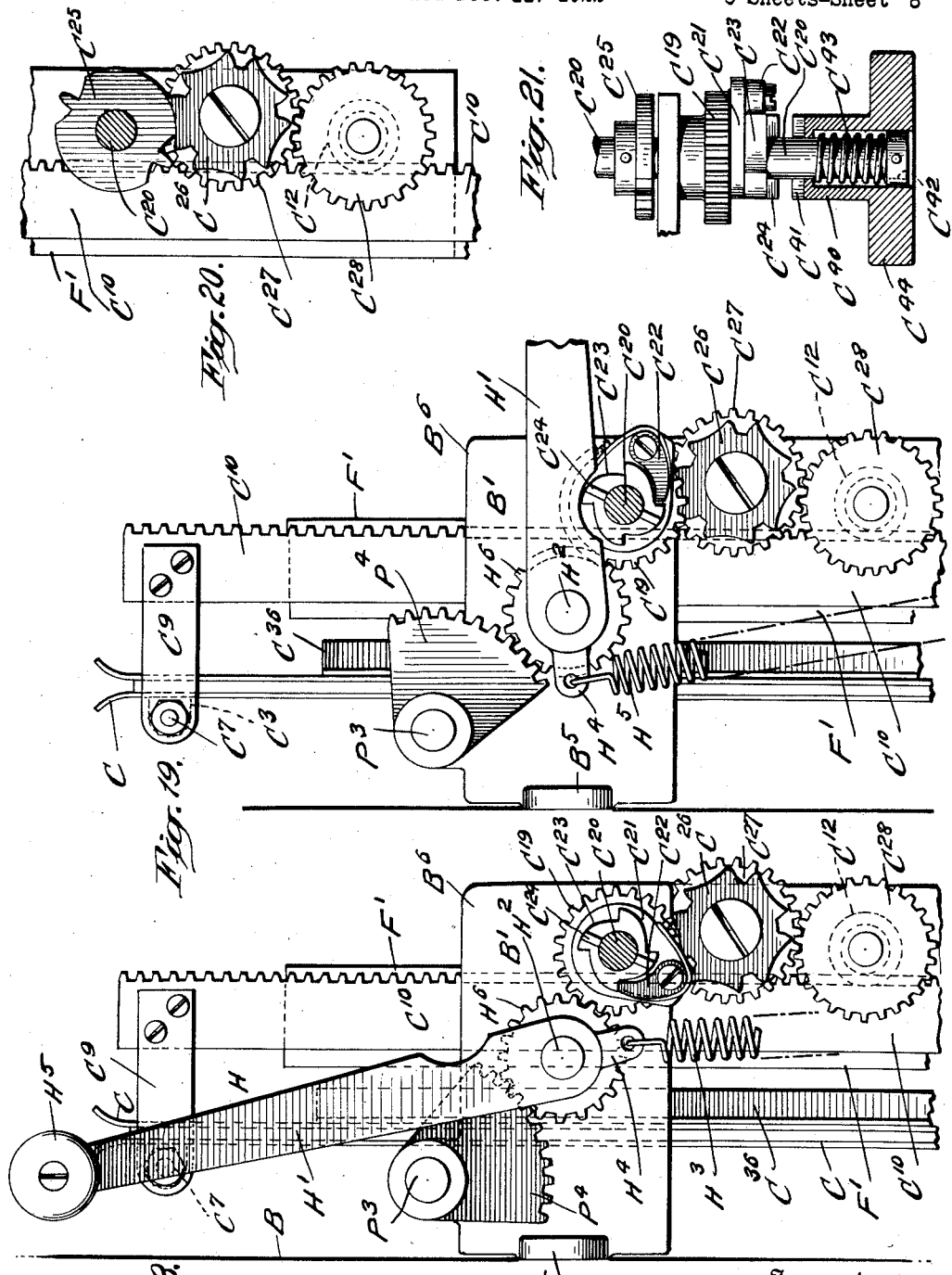

Nov. 6, 1928.

R. H. MATTHIESSEN ET AL 1,690,827

DEVICE FOR CHECKING THE OPERATION OF VEHICLES

Filed Dec. 11, 1922    9 Sheets-Sheet 9

Fig. 22.

Inventors
Ralph H. Matthiessen
and William Berlin Edison
By Arthur L. Kent
Their Atty.

Patented Nov. 6, 1928.

1,690,827

UNITED STATES PATENT OFFICE.

RALPH H. MATTHIESSEN AND WILLIAM BARTON EDDISON, OF IRVINGTON, NEW YORK.

DEVICE FOR CHECKING THE OPERATION OF VEHICLES.

Application filed December 11, 1922. Serial No. 606,046.

This invention relates to devices for checking the operation of vehicles and aims to provide means by which the work of the operator of a vehicle may readily be checked so as to ascertain whether or not the vehicle has been operated efficiently and in accordance with the owner's instructions.

A device embodying the invention in the form which we believe to be most satisfactory combines means for measuring and indicating the distance travelled by the vehicle, the elapsed time, and the time during which the vehicle has been standing or idle.

A further feature of the invention consists in providing the device with means for making simultaneous cumulative records of these three measurements.

A still further feature consists in arranging the device to print such records upon a card which may at any time be withdrawn from the device for the purpose of writing additional data upon it.

The invention may best be understood from a detail description of a device embodying it in its most complete form. Such a device is illustrated in the accompanying drawings, in which:—

Fig. 1 is a front elevation of the complete device;

Fig. 2 is a front elevation of the device with the casing removed and the back plate omitted;

Fig. 3 is an enlarged back elevation of part of the main frame of the device and the printing trains and their operating mechanism mounted on this frame, the back plate, the platen, and the ribbons being omitted, and parts being sectioned on the lines 3—3 of Fig. 5;

Fig. 4 is an enlarged fragmentary vertical section taken on the line 4—4 of Fig. 2, showing the mechanism for operating the mileage train;

Fig. 5 is an enlarged fragmentary vertical section on the line 5—5 of Fig. 2, and Fig. 6 is a horizontal section on the line 6—6 of Fig. 3, both showing the mechanism for operating the time train and the standing time train;

Figs. 7 and 8 are detailed views of the alignment mechanism for the time train, Fig. 7 being a fragmentary section on the line 7—7 of Fig. 3, and Fig. 8 a fragmentary section on the line 8—8 of Fig. 3;

Fig. 9 is an enlarged axial section of the clutch through which the idle time train is operated, and Fig. 10, on sheet 4, is a fragmentary section on the line 10—10 of Fig. 4, showing a part of the mechanism for actuating this clutch.

Fig. 11 a horizontal section on the line 11—11 of Fig. 2, Fig. 12 a horizontal section on the line 12—12 of Fig. 2, and Fig. 13 an enlarged fragmentary vertical section on the line 13—13 of Fig. 2, showing the card holding mechanism and printing mechanism;

Fig. 14, on sheet 6, is an enlarged fragmentary back elevation of the mechanism for moving the card carrier sideways;

Fig. 15, on sheet 5, is a vertical section on the line 15—15 of Fig. 2, showing the mechanism for indicating the position of the card carrier;

Figs. 16 and 17, on sheet 7, are detailed views of the mechanism for feeding the printing ribbons, Fig. 16 being a fragmentary vertical section on the line 16—16 of Fig. 2, and Fig. 17 a similar section on the line 17—17 of Fig. 2;

Figs. 18, 19 and 20 show the manually operated mechanism for actuating the printing mechanism and moving the card carrier; Fig. 18 being a large fragmentary vertical section on the line 18—18 of Fig. 2 with the handle in raised position; Fig. 19 a similar view with the handle in printing position, and Fig. 20 a fragmentary section on the line 20—20 of Fig. 2;

Fig. 21 is a fragmentary side view of the mechanism for resetting the card carrier, the knurled wheel of this mechanism being shown in axial section;

Fig. 22 is a view of an approved form of record card used in the device.

General arrangement.

The device illustrated is built up on a back plate B which may be secured to any convenient part of the vehicle. The main frame F of the device is secured to the back plate by brackets $B^1$, $B^2$, $B^3$, $B^4$, which hold the frame F a short distance in front of the front surface of the back plate. On the frame F are mounted three trains of printing wheels, M, T, S together with mechanism for operating these trains so that they indicate respectively the distance traveled by the vehicle, the time, and minutes of idle or standing time. The frame F also carries one or more printing ribbons N which extend just behind the wheels of the three trains.

A carrier C for a record card R is mounted so as to be movable both vertically and horizontally in the space between the back plate B and the main frame F. Behind the card carrier is a movable platen P for pressing the card against the ribbons and printing wheels. At the left-hand end of the back plate is a manually operated mechanism H for moving the card carrier C and actuating the platen P.

A casing K, which covers the main frame F and the mechanism mounted on and behind this frame, is secured to the edge portion of the front surface of the back plate B outside the frame brackets $B^1$, $B^2$, $B^3$, $B^4$. In order to prevent tampering with the mechanism by the operator of the vehicle, the casing K may be locked in the main frame F by means of a lock L.

Frame.

The main frame F of the device is rectangular in form and consists of two side plates $F^1$, $F^2$, and two horizontal plates $F^3$, $F^4$ extending between the two side plates. The side plates $F^1$, $F^2$ have the form of angle irons, so that they provide guide-ways for the racks on which the movable card carrier C is mounted, as hereinafter explained.

The main frame F is supported from the back plate B by means of brackets $B^1$, $B^2$, $B^3$, $B^4$, which hold the frame at a little distance in front of the front surface of the back plate B. The bracket $B^1$ (best seen Figs. 2, 12 and 18) has a foot $B^5$ secured to the back plate, an outer plate $B^6$ extending from the foot $B^5$, an inner plate $B^7$ connected to the outer plate by a bridge portion $B^8$ and secured to the side plate $F^1$ of the main frame F. The brackets $B^2$, $B^4$ are alike. They are best seen in Figs. 2 and 11. Each has a foot $B^9$ secured to the back plate, and arm $B^{10}$ extending downwardly. The side plates $F^1$, $F^2$ of the frame are secured to the ends of the arms $B^{10}$ through links $B^{11}$ and bolts $B^{12}$, which are surrounded by the spacing sleeves $B^{13}$.

The bracket $B^3$ (best seen in Figs. 2 and 12) is similar to the brackets $B^2$ and $B^4$ except that it is secured to the plate $F^2$ by means of two bolts $B^{13}$, $B^{14}$.

A frame $F^5$, having arms $F^6$, $F^7$, $F^8$, $F^9$, is secured between the horizontal plates $F^3$, $F^4$ of the main frame. A frame or bracket member $F^{10}$ is secured to the upper side of the horizontal plate $F^3$.

Mileage train and mechanism for operating it.

The mileage train M, best seen in Figs. 3, 4, is mounted between the bars $F^7$, $F^8$ of the frame $F^5$. It consists of a train of printing wheels, $M^1$, $M^2$, $M^3$, $M^4$, $M^5$, $M^6$ geared together through idler gears $M^7$ in such manner that the raised figures or type on the wheels indicate mileage in miles and tenths of miles in accordance with the decimal system. It is of the type customarily used in recording odometers and is, therefore, not described in detail. As is usual, the wheels of the train are geared together so as to provide for a certain amount of lost motion, and means are provided for giving the end wheel $M^1$ of the train a step by step motion. These means are shown in Fig. 4 and include a notched wheel $M^8$ secured to the wheel $M^1$, and a lever $M^9$ having at one end a roller $M^{10}$ which is urged against the notched wheel by a spring $M^{11}$.

The mileage train M is driven through a gearing $M^{12}$ from a gear $M^{13}$ which meshes with a worm $M^{14}$ upon a shaft $M^{15}$ which is driven through gear $M^{17}$, by a flexible shaft $M^{18}$ connected with the vehicle wheel, as in ordinary odometers and speedometers. From the arrangement described, it will be understood that the mileage train indicates the total number of miles traveled by the vehicle since the train was first set at zero. The wheels are set so that the mileage is indicated by the number on each wheel which faces inwardly towards the back plate B.

Time train and mechanism for operating it.

The time train T (best seen in Fig. 3) is mounted between the arms $F^8$ and $F^9$ of the frame $F^5$. This train consists of three numbered wheels $T^1$, $T^2$, $T^3$, and one lettered wheel $T^4$, which are geared together through idler gears $T^5$ on the shaft $T^7$ in such a manner that they indicate the time in hours and minutes and whether before or after noon. The train is similar to that ordinarily used in recording clocks and is, therefore, not described in detail.

The time train T is driven from a gear $T^{10}$ which is a part of a clock movement enclosed within a case $T^{11}$ mounted under the horizontal plate $F^3$ of the main frame F. As the clock movement is of known construction, it is not illustrated in the drawings. I find it desirable to use a movement of the type manufactured by the Chelsea Clock Company, in which an intermittent movement is imparted to the gear $T^{10}$ at intervals of one minute. The movements of the gear $T^{10}$ are transferred to a gear $T^{12}$ secured to the minute wheel $T^1$ of the time train T through intermediate gearing $T^{13}$ (Figs. 3 and 5). The gearing $T^{13}$ is so arranged that the motion which is given to the gear $T^{10}$ each minute by the clock movement causes the wheel $T^1$ to move through the angle which separates the raised numbers or type on the periphery of the wheel.

In order to make sure that the numbers on the wheels of the time train are in exactly the right position to make an impression, notwithstanding the lost movement which is inevitably provided in the gearing $T^{13}$, a star wheel is secured to the wheel $T^1$ outside the gear $T^{12}$, and this wheel is held in the predetermined position whenever an impression is made by means of an aligning mechanism mounted on a shaft $T^{14}$. As this mechanism is operated by a cam upon the shaft which moves the platen P, in printing from the train, its operation is hereinafter described in connection with the printing mechanism.

In order that the time which is indicated by the numbers on the wheels of the printing train may be ascertained from the outside of the device, a clock face $T^{15}$, and minute and hour hands $T^{16}$, $T^{17}$, visible through a glass-covered opening $K^1$ in the casing K, are provided. The minute and hour hands $T^{16}$, $T^{17}$ are driven from the gear $T^{12}$, which is secured to the minute wheel $T^1$. A connection between these parts is provided by an idler gear $T^{20}$ meshing with the gear $T^{12}$ and with a gear $T^{21}$ on a sleeve $T^{22}$ which is fixed on a shaft $T^{23}$. Fixed on the other end of the shaft $T^{23}$ is a worm $T^{24}$, which drives a gear $T^{25}$ on the shaft $T^{26}$ on which the minute hand $T^{16}$ is mounted. The hour hand $T^{17}$ is driven from the minute hand shaft in the usual manner.

Standing-time train and mechanism for operating it.

The standing-time train S (best seen in Figs. 3 and 5) consists of four numbered wheels $S^1$, $S^2$, $S^3$, $S^4$, mounted between the bars $F^8$, $F^9$, of the frame $F^5$ immediately to the right of the time train T in Fig. 3. The wheels of the standing-time train are geared together through idler gears $S^5$ on the decimal system and are arranged in the manner similar to the wheels of an ordinary recording odometer train.

The standing-time train is driven from the same clock movement which drives the time train, but a clutch is interposed in the driving connection, and mechanism operated by the vehicle motion is provided for actuating this clutch when the vehicle speed reaches a predetermined value. In the device shown in the drawings, this mechanism is arranged in such manner that the standing time train is driven by the clock movement only when the vehicle is at rest, or nearly so.

In the particular arrangement shown in the drawings, a gear $S^7$ attached to the unit wheel $S^1$ of the standing-time train is driven from the gear $T^{12}$ attached to the minute wheel $T^1$ of the time train, this gear $T^{12}$ being driven from the gear $T^{10}$ of the clock movement through the mechanism already described. The connection between the gear $T^{12}$ and the gear $S^7$ includes the gears $T^{20}$ and $T^{21}$ already described, a toothed clutch $S^8$, a gear $S^9$ similar to the gear $T^{21}$ except that it has a wider face, and an idler gear $S^{10}$ mounted on the shaft $T^7$ and similar to the gear $T^{20}$. The gear $S^9$ is formed on a sleeve $S^{11}$, which is slidably mounted on a rod $S^{12}$ which is fixed in the arms $F^7$, $F^8$ of the frame $F^5$ and projects into a central bore $S^{13}$ in the end of the shaft $T^{23}$ so as to provide a bearing for the free end of said shaft. The clutch $S^8$ consists of teeth $S^{14}$ formed on the sleeve $T^{22}$ on which the gear $T^{21}$ is mounted and corresponding teeth $S^{15}$ formed on the sleeve $S^{11}$ on which the gear $S^9$ is mounted. The clutch is normally closed by a compression spring $S^{16}$ which urges the sleeve $S^{11}$ toward the fixed sleeve $T^{22}$ (Figs. 3 and 9).

In order that the standing-time train may be driven only when the vehicle is inactive, clutch operating mechanism is provided for moving the sleeve $S^{11}$ so as to bring the teeth $S^{15}$ out of engagement with the teeth $S^{14}$ when the vehicle is traveling at a speed greater than a predetermined minimum, which may be made as small as desired.

The clutch-operating mechanism, best seen in Figs. 3, 4, 5, 10, is controlled by the speed of rotation of the shaft $M^{15}$, which is driven from the vehicle wheel, as before explained, so that its speed of rotation is proportional to the speed of the vehicle. For this purpose, the shaft $M^{15}$ is extended through the horizontal plate $F^5$ of the main frame F and connected at its upper end by gearing $S^{20}$ with a pinion $S^{21}$ upon a short vertical shaft $S^{22}$. The shaft $S^{22}$ has, at its lower end, a bearing in a spring-pressed plunger $S^{23}$ mounted on the upper side of the horizontal plate $F^5$ of the main frame F. The upper end of this shaft $S^{22}$ is located in a central bore in a shaft $S^{24}$ which is mounted in the frame $F^{10}$. Fixed on the shaft $S^{22}$ is a disk $S^{25}$ having a friction facing $S^{26}$ which is urged against a disk $S^{27}$ mounted upon the shaft $S^{24}$, by the spring-pressed plunger $S^{23}$.

An externally threaded sleeve $S^{30}$ is fixed on the shaft $S^{24}$ and a housing $S^{31}$ surrounds a portion of the shaft $S^{24}$ and is provided with an internally threaded extension $S^{32}$, which is screwed upon the external threads of the sleeve $S^{30}$. By turning the housing $S^{31}$ with respect to the shaft $S^{24}$ in one direction, the housing may be screwed downwardly along the sleeve $S^{30}$ until a pin $S^{33}$ on the end of its extension $S^{32}$ engages a pin $S^{34}$ on the sleeve $S^{30}$. By turning the housing $S^{31}$ with respect to the shaft $S^{24}$ in the opposite direction, the housing may be screwed upwardly until a pin $S^{35}$ on the housing is brought into engagement with a pin $S^{36}$ on a sleeve $S^{37}$ fixed on the shaft $S^{24}$. Within the housing $S^{31}$ is a coil-spring $S^{38}$ having its ends fastened to the housing and the shaft $S^{24}$, respectively, and coiled so that it is placed under greater tension when the housing is screwed upwardly on the sleeve $S^{30}$.

Fixed to the housing $S^{31}$ is a gear $S^{40}$, which meshes with a pinion $S^{41}$ on a shaft $S^{42}$ mounted in the frame $F^{10}$ at one side of the shafts $S^{22}$ and $S^{24}$ (Fig. 3). The shaft $S^{42}$ extends into a casing $S^{43}$ which contains a cylindrical bore $S^{44}$ extending at right angles to the shaft $S^{42}$. An eccentric pin $S^{45}$, mounted at the end of the shaft $S^{42}$, engages a slot $S^{46}$ in a plunger $S^{47}$ which fits loosely in the cylindrical bore $S^{44}$ of the casing $S^{43}$ (Fig. 10). The casing $S^{43}$ and the bore $S^{44}$ are filled with oil or other suitable fluid, which retards the reciprocation of the plunger and thus affords a drag upon the shaft $S^{42}$ which, in turn, retards the gear $S^{40}$ and thus limits the speed at which the housing $S^{31}$ may rotate.

When the vehicle is stationary the parts which have been described take the position in which they are shown in Figs. 3, 4, 5.

When the vehicle is started, the shaft $S^{24}$ is rotated through the friction discs $S^{25}$, $S^{27}$ at a speed greater than that at which the housing $S^{31}$ is permitted to turn by the piston $S^{47}$. This causes the housing $S^{31}$ to move downwardly on the threaded sleeve $S^{30}$. The downward motion of the housing continues until the pin $S^{33}$ on the housing comes in contact with the pin $S^{34}$ on the sleeve $S^{30}$. This movement of the housing places the spring $S^{38}$ under greater tension. When the pins $S^{33}$, $S^{34}$ come into engagement, the speed of rotation of the shaft $S^{24}$ is reduced to that of the housing, this reduction in speed being permitted by slipping of the disc $S^{25}$ on the disc $S^{27}$. When the vehicle is stopped, the rotation of the shaft $S^{22}$ ceases, and through the friction between the discs $S^{25}$ and $S^{27}$ the shaft $S^{24}$ is brought to rest. The rotation of the housing $S^{31}$ continues under the effect of the coil-spring $S^{38}$. This rotation caused by the spring tension screws the housing $S^{31}$ upwardly along the sleeve $S^{30}$, so that the pin $S^{33}$ on the housing moves out of contact with the pin $S^{34}$ on the sleeve $S^{30}$. If the vehicle continues stationary, the upward motion of the housing, caused by the spring $S^{38}$, continues until the pin $S^{35}$ at the upper end of the housing strikes the pin $S^{36}$ on the collar $S^{37}$.

Although, in describing the operation of this mechanism reference has been made to bringing the vehicle to a complete stop, it is apparent that if the vehicle's speed is reduced to such an extent that the rotation imparted to the shaft $S^{22}$ by the motion of the vehicle is less than the speed at which the piston $S^{47}$ permits the coiled spring to rotate the housing $S^{31}$, the housing will be screwed upward in the same way as when the vehicle is stopped; and, conversely, when the vehicle's speed is raised above this minimum, the housing $S^{31}$ will be screwed downward, as described in connection with the starting the vehicle.

The result of the operation which has been described is that the housing $S^{31}$ is moved downward almost immediately after the starting of the vehicle, and is moved upward almost immediately after the vehicle stops, or at least after the speed of the vehicle is reduced below a predetermined minimum which may be made very small. This up and down motion of the housing $S^{31}$ is utilized to actuate the clutch sleeve $S^{11}$ to make and break the connection between the standing-time train S and the clock movement. The connecting mechanism between the housing $S^{31}$ and the sleeve $S^{11}$ includes a trunnion $S^{50}$ having screws $S^{51}$ engaging a groove $S^{52}$ in the extension $S^{32}$ of the housing, a shaft $S^{53}$, mounted on the frame $F^{10}$, on which the trunion $S^{50}$ is fixed, an arm $S^{54}$ also fixed on the shaft $S^{53}$, a lever $S^{55}$ extending through an opening $F^{15}$ in the horizontal plate $F^{3}$ of the main frame F and through an opening in the frame $F^{5}$, pivoted at $S^{56}$ on the frame $F^{5}$, connected at its upper end with the free end of the arm $S^{54}$, and having at its lower end a trunnion $S^{57}$ bearing screws $S^{58}$ engaging a groove $S^{59}$ in the sleeve $S^{11}$.

The connecting mechanism which has been described is so arranged that the clutch $S^{8}$ is closed when the housing $S^{31}$ is moved upward by the stopping of the vehicle. In consequence, the standing time train S indicates directly the number of minutes during which the vehicle has been standing or idle. It is apparent that if the connecting mechanism were arranged to open the clutch $S^{8}$ on the stopping of the vehicle, the train S would still indicate the time during which the vehicle had been idle, but in this case the standing or idle time would be indicated indirectly, that is to say, the amount indicated by the train S would have to be subtracted from the total elapsed time in order to ascertain the standing time. Such a reversal of parts is within the scope of our invention. It should be understood, therefore, that when reference is made herein to "mechanism operated by the travel of the vehicle to actuate the clutch when the vehicle speed reaches a predetermined value", the actuation of the clutch referred to may be either an opening or a closing thereof. Furthermore, the reference to a "predetermined value" of the vehicle speed is to be understood to include a case in which this value is zero, so that the actuation of the clutch takes place immediately upon the stopping or starting of the vehicle.

It is apparent that the mechanism which thus far has been described, provides means for measuring and indicating the distance travelled by a vehicle, the time, and the standing-time, or, more specifically, the total number of minutes during which the vehicle has been idle. This mechanism may, for certain purposes, desirably be used independently of the other parts of the device illustrated. The device illustrated, however, includes, in addition, means for making cumulative records of these measurements by printing from the trains of printing wheels upon the record card as frequently as desired.

The record card, the card carrier and its mounting.

A type of record card R which may be used in the device illustrated is shown in Fig. 22. At the right-hand side of this card are two columns marked, respectively, "Arrive" and "Leave". Each of these columns is sub-divided into three separate columns marked, respectively, "Mileage", "Standing time" and "Time", and positioned so as to correspond with the arrangement of the printing trains. The entire card is horizontally ruled and the lines on the card are numbered on the right-hand edge of the card. The left-hand portion of the card provides a space in which data may be entered by the driver when the card is removed from the device.

The device is provided with a card carrier C which is open at the top so that a record card may be slipped into it or withdrawn from it at any time. The casing K of the device is provided with a top opening $K^2$ through which the cards may be inserted in the card carrier and through which the carrier C itself projects when it is in raised position, as shown in Fig. 1. The carrier is provided with corresponding openings $C^1$, $C^2$ in its front and back walls extending across the "Arrive" and "Leave" columns to provide for printing upon the card while it is in the carrier.

The card carrier C is movably mounted between the back plate B and the main frame F. Its mounting may best be seen in Figs. 2, 11, 12, 13. The carrier C has on its back projections $C^3$, $C^4$, $C^5$, $C^6$ which are slidably mounted on two horizontal rods $C^7$, $C^8$ whose ends are secured on brackets $C^9$ extending rearwardly from vertical rack bars $C^{10}$, $C^{11}$. The rack bars $C^{10}$, $C^{11}$ are slidably mounted on the side plates $F^1$, $F^2$ of the main frame F, which have the form of angle irons so that they provide slide-ways for the rack bars. The rack bars $C^{10}$, $C^{11}$ are retained in these slide-ways and moved therein by pinions $C^{12}$, $C^{13}$ mounted on a shaft $C^{15}$ extending across the front of the main frame F and having a bearing thereon at $C^{16}$ and a beairng in the inner plate $B^7$ of bracket $B^1$ at $C^{17}$.

Mechanism for moving card carrier.

The card carrier C is moved by a manually operated mechanism H which also moves the platen P to press the card R against the printing wheels of the trains M, T, S. The motion given to the card carrier C is such that successive records are printed alternately in the "Arrive" and "Leave" columns of the record card R in the carrier. The mechanism for imparting such a movement to the card carrier C is best seen in Figs. 2, 12, 14, 15, and Figs. 18 to 21.

A lever $H^1$, by which the mechanism H is operated, is fixed on a stub shaft $H^2$ rotatably mounted on the bracket $B^1$. The lever $H^1$ is normally retained in the position shown in Figs. 2 and 18 by a tension spring $H^3$ secured at one end to the bracket $B^2$ and at the other end to a tab $H^4$ on the lever $H^1$. The lever $H^1$ projects through a slot $K^3$ in the casing K of the device (Fig. 1). The lever has at its free end a handle $H^5$ by means of which it is pressed down from the position shown in Figs. 2 and 18 to the position shown in Fig. 19, and allowed to spring up again, whenever a record is to be printed from the trains M, T, S.

A pinion $H^6$ is fixed on the shaft $H^2$ just inside the lever $H^1$. This pinion meshes with a pinion $C^{19}$ which is loosely mounted on a horizontal shaft $C^{20}$ which extends part way across the front of the main frame F and has the bearing in the bar $F^6$ of the frame $F^5$ and a bearing in the bracket $B^1$. Secured to the pinion $C^{19}$ is a plate $C^{21}$ on which is mounted a pawl $C^{22}$. This pawl engages a four-toothed ratchet $C^{23}$ which is loosely mounted on the shaft $C^{20}$. The ratchet $C^{23}$ has, on its outer side, teeth $C^{24}$ which are opposed to similar teeth $C^{41}$ formed on the inner end of a sleve $C^{40}$ which is slidable on the shaft $C^{20}$, but restrained against rotation with respect to the shaft by means of a spline $C^{42}$. A compression spring $C^{43}$ normally holds the teeth $C^{41}$ in engagement with the teeth $C^{24}$ so as to connect the ratchet $C^{23}$ with the shaft $C^{20}$ (see Fig. 21).

As, at each printing, the lever $H^1$ is pressed from the position shown in Fig. 18 to the position shown in Fig. 19, and then allowed to return to its original position under the force of the tension spring $H^3$, the shaft $H^2$ is thereby oscillated through an angle slightly greater than 90°. This oscillatory motion is imparted to the pawl plate $C^{21}$ through the pinions $H^6$ and $C^{19}$. The part of each oscillation of the pawl plate $C^{21}$ which occurs during the upward movement of the lever $H^1$ causes the pawl $C^{22}$ to rotate the ratchet $C^{23}$ and the shaft $C^{20}$, to which the ratchet is connected, through an angle of 90°.

A two-tooth Geneva gear $C^{25}$, fixed on the shaft $C^{20}$, engages a cooperating Geneva gear $C^{26}$ rotatably mounted on a stud projecting from the inner plate $B^7$ of the bracket $B^1$. As the Geneva gear $C^{25}$ has only two teeth, it is apparent that the gear $C^{26}$ will be moved once on each half-revolution of the gear $C^{25}$. Since the shaft $C^{20}$ and the gear $C^{25}$ are turned through 90° upon each movement of the lever $H^1$, the gear $C^{26}$ is turned only upon alternate movements of the lever $H^1$. The motion of the gear $C^{26}$ is transferred to the shaft $C^{15}$, on which are fixed the pinions $C^{12}$, $C^{13}$ which engage the rack bars $C^{10}$, $C^{11}$, through a pinion $C^{27}$ secured to the gear $C^{26}$ and a pinion $C^{28}$ fixed on the shaft $C^{15}$. The intermittent rotation thus imparted to the shaft $C^{15}$ and the pinions $C^{12}$, $C^{13}$ causes the rack bars $C^{10}$, $C^{11}$ and the card holder C to move a short distance upwardly on every other upward movement of the lever $H^1$.

The intermittent rotation of the shaft $C^{20}$ is utilized to give the card carrier C a sideways reciprocatory movement so that impressions may be made alternately in the "Arrive" and "Leave" columns on the card R. As already explained, the shaft $C^{20}$ is rotated through an angle of 90° upon each upward movement of the lever $H^1$. Upon the shaft $C^{20}$ is fixed a bevelled gear $C^{30}$ which meshes with a smaller bevelled gear $C^{31}$ rotatably mounted on bracket $F^{16}$ depending from the horizontal plate $F^3$ of the main frame F (Figs. 2, 3). The number of teeth upon the bevelled gears $C^{30}$ and $C^{31}$ are so proportioned that the bevelled gear $C^{31}$ is turned through 180° on each 90° turn of the gear $C^{30}$.

An arm $C^{32}$ is fixed to the bevelled gear $C^{31}$ at such an angle that the arm is horizontal when the shaft $C^{20}$ comes to rest between its intermittent movements. The outer end of the arm $C^{32}$ is connected through a link $C^{33}$ to a bar $C^{34}$ slidably mounted in a guideway $C^{35}$ secured on the ends of two brackets $F^{17}$, $F^{18}$ extending upwardly from the horizontal plate $F^4$ of the main frame F (Fig. 14). The end of the bar $C^{34}$ engages a projection $C^{36}$ on the card carrier C (Figs. 12, 14). From this arrangement it is apparent that the card carrier C is moved sideways in one direction or the other a distance equal to twice the length of the arm $C^{32}$ upon each upward movement of the handle $H^1$.

Setting mechanism is provided to move the card carrier C downward, that is, in the reverse direction from the motion imparted to it by operation of the lever $H^1$. This mechanism, shown in Figs. 2 and 21, is used to reset the card carrier C after the record upon one card is complete, so that the printing on a new card will be begun at the top line, or any desired line, thereon. The setting mechanism includes, in addition to parts already described, a knurled wheel $C^{44}$ formed on the outer end of the sleeve $C^{40}$. To reset the card carrier C, the wheel $C^{44}$ is pulled out, bringing the teeth $C^{41}$ of the sleeve $C^{40}$ out of contact with the teeth $C^{24}$ of the ratchet $C^{23}$, as shown in Fig. 21. The wheel $C^{44}$ may then be turned in either direction, causing a corresponding turning of the shaft $C^{20}$ to which the sleeve $C^{40}$ is splined. As the ratchet $C^{23}$ is unconnected with the shaft $C^{20}$, the turning of this shaft does not move the hand-operated mechanism H. The rotation of the shaft $C^{20}$ through the wheel $C^{44}$ causes a rotation of the shaft $C^{15}$ through the connecting mechanism already described. This rotation causes the pinions $C^{12}$, $C^{13}$ to move the rack bars $C^{10}$, $C^{11}$ carrying the card carrier C. In this manner the card carrier may be moved downwardly after the record upon one card is completed, so that the first record upon the next card will be made near the top thereof. During such downward movement the card carrier is, of course, also given a sideways reciprocation because of the connection between the shaft $C^{20}$ and the slide bar $C^{34}$ which has already been described.

In order to indicate the position of the card carrier C so that the line and column on the card R in which the next record will be made may be ascertained without removing the casing K, indicating means visible through holes in the casing K are provided.

The means for indicating the vertical position of the carrier includes a circular disc $C^{50}$ which is rotatably mounted on a bracket $F^{19}$ which is secured to the horizontal plate $F^4$ of the main frame F. On the back of this disc $C^{50}$ is a bevelled gear $C^{51}$ which meshes with a bevelled gear $C^{52}$ secured on the shaft $C^{15}$ (Figs. 14, 15). On the front of the disc $C^{50}$ are a series of figures which are positioned about the periphery of the disc and separated by angular distances equal to the angle through which the disc is turned upon each movement of the shaft $C^{15}$ (Fig. 2). One of these figures is visible through an opening $K^4$ in the casing K (Figs. 1, 15). The disc is so set that the figure which is thus visible corresponds to the line on the record card R in the carrier C which is directly behind the printing trains M, T, S.

The column in which the next impression is to be made is indicated by a strip $C^{55}$ mounted upon a bracket $C^{56}$ secured to the sliding bar $C^{34}$. In positions on the strip $C^{55}$ separated by a distance equal to twice the length of the arm $C^{32}$ are marked the words "Arrive" and "Leave". When the card carrier C is moved to its extreme position to the right (Fig. 2) the word "Arrive" is visible through an opening $K^5$ in the casing K. When the card carrier is moved to its extreme position in the opposite direction, the word "Leave" appears in the opening $K^5$, indicating that the next impression will be made in the "Leave" column.

*Printing mechanism.*

In order to make a record of the numbers of the wheels of the printing trains M, T, S which face the back plate B when the lever $H^1$ is pressed down, a platen P is provided to press the portion of the card R opposite these numbers against the printing wheels. The platen P is mounted in a channel iron $P^1$ which is carried at the free ends of two arms $P^2$ fixed on a shaft $P^3$ which extends between the frame brackets $B^1$, $B^3$ behind the card carrier C. The motion of a lever $H^1$ is transferred to the shaft $P^3$ through the pinion $H^6$ fixed on the shaft $H^2$ and a segment gear $P^4$ fixed on the shaft $P^3$. The arrangement is such that when the lever $H^1$ is pressed down, as shown in Fig. 19, the platen P is swung against the printing wheels, as shown in Fig. 4. When the lever $H^1$ is released and thrown up to its normal position by the spring $H^3$, the platen P is swung away from the card to the position shown in Fig. 5, so that it is not in contact with the card during the motion which is imparted to the card carrier C during the upward movement of the lever $H^1$ by the mechanism already described.

The mechanism on the shaft $T^{14}$ for correctly positioning the minute wheel $T^1$ of the time train T is actuated by a cam $T^{30}$ mounted on the platen shaft $P^3$. When the shaft $P^3$ is turned so as to bring the platen P against a record card R, this cam $T^{30}$ encounters a spring-pressed lever $T^{31}$ mounted near one end of the shaft $T^{14}$ (Fig. 8) oscillating this shaft so as to move an arm $T^{32}$ on the other end of the shaft into contact with a star wheel $T^{33}$ attached to the minute wheel $T^1$ of the time train T (Fig. 7).

To avoid the necessity of inking the type on the printing wheels, the impression is made through carbon ribbons N which extend over the back of the printing wheels. These ribbons extend from spools $N^1$ mounted on brackets $F^{20}$, extending upwardly from the horizontal plate $F^3$ of the main frame F, to spools $N^2$ mounted on brackets $F^{21}$ extending upwardly from the lower horizontal plate $F^4$. In order to secure clear impressions, the ribbons are wound from the spools $N^1$ to the spools $N^2$. To accomplish this, the spools $N^2$ are turned through a small angle on each revolution of the shaft $C^{20}$ by a ratchet mechanism $N^4$, shown in Fig. 16, and actuated by a short arm $N^5$ projecting radially from the shaft $C^{20}$ near the inner end of this shaft.

*Use of device.*

The method of using the device which has been described is as follows:—Before the vehicle leaves its point of departure the card carrier C is set so that the first impression will be made on line 1 of the "Leave" column. On starting, the driver places the record card R in the card carrier C and presses down the handle $H^1$. The upward movement of the handle $H^1$ after this record is made shifts the card carrier C so that the next impression will be made in the "Arrive" column on line 2. On his arrival at the first station of his route, the driver again presses down the handle $H^1$. He may then remove the card R from the carrier C and enter on line 2 at the left-hand end of the card the name of the station and a note of the transaction taking place there. On leaving the station, he replaces the card in the carrier and again presses down the handle, this time making an impression on line 2 of the "Leave" column. In the same manner, he continues to make a record upon his arrival and departure from each station on the route, and finally upon his arrival at the end of the route.

In order to check up the driver's work, the first figures in the "Leave" column are subtracted from the final figures in the "Arrive" column. In this way the total mileage, the total elapsed time and the total number of minutes of standing or idle time are ascertained. If these figures correspond with a predetermined standard for the route in question, no further check is necessary. This is because the driver cannot waste time on one part of the route and make up for it by speeding on another part of the route without making a record which will indicate an excessive number of total idle minutes.

If the total number of idle minutes ascertained by subtraction of the first and last figures is excessive, the card may then be analyzed to see where the time was wasted. To do this each idle minute figure is substracted from the subsequently recorded idle minute figure. If the difference between an idle minute figure in the "Leave" column and the idle minute figure on the next line of the "Arrive" column is excessive, this indicates that time was wasted between two stations. If, on the other hand, the difference between the idle minute figure in the "Arrive" column and the idle minute figure on the same line of the "Leave" column is excessive, this indicates that time has been wasted at a station. It may often happen that the time may have been wasted at a station without fault of the driver, while, on the other hand, the driver may fairly be held responsible for time wasted on the road between stations. For this reason, it may sometimes happen that the driver will attempt to cover up the time wasted on the road by making a record in the "Arrive" column before he actually arrives at the station in question. Such fraudulent practices may, however, be at once detected from the card, for if the device is used in accordance with instructions, the two figures in the "Mileage" column upon any one line will be the same, and the difference between the two idle time figures on any one line will be the same as the difference between the two time figures on this line.

The record made by the device, therefore, affords an absolute check upon the driver's work, indicating any waste of time, any speeding, and any attempt to falsify the record. Furthermore, if the driver's conduct has been proper, this fact may be at once ascertained by merely subtracting the initial figures from the final figures on the card, so that no time need be wasted in analyzing the figures upon any cards relating to trips where the driver's conduct has been thus shown to be satisfactory.

The device which has been described embodies all the features of the invention combined in such a manner as to give a convenient, complete and easily used record. It is apparent, however, that in cases where a simpler record is sufficient and a less elaborate device is desired, certain portions of the device described may be omitted. Thus, for example, the mechanism causing the sideways reciprocation of the card may be omitted, so that successive records will be made one under another in a single column. Furthermore, instead of providing a card carrier which permits the insertion and withdrawal of cards as desired, the device may be arranged to print upon a ribbon or strip of paper. While we do not consider it desirable to do so, it is true that the printing parts of the apparatus may be altogether omitted and the "Mileage","Standing time" and "Time" trains may be provided with figures which may be read directly instead of with type.

We shall not, however, attempt to point out all the modifications which may be made in the device described without departing from our invention.

What is claimed is:

In a device for checking the operation of vehicles, the combination of a train of numbered wheels, a clutch, a clock movement arranged to drive said train through said clutch, a member moved by the travel of the vehicle at a speed proportional to the speed of such travel, a speed limiting device cooperating with said member, and means for opening said clutch when the speed of said member exceeds that permitted by the speed limiting device and for closing said clutch when the speed of said member falls below that permitted by the speed limiting device.

In testimony whereof we have hereunto set our hands.

RALPH H. MATTHIESSEN.
WILLIAM BARTON EDDISON.